United States Patent [19]

Jimenez et al.

[11] Patent Number: 5,018,467
[45] Date of Patent: May 28, 1991

[54] ADJUSTMENT DEVICE FOR FEEDING CLOTH IN A CLOTH TRANSPORT MECHANISM FOR A SEWING MACHINE

[75] Inventors: Antonio Jimenez, Meyrin; Pierre-Maurice Rochat, L'Orient, both of Switzerland

[73] Assignee: Mefina S.A., Switzerland

[21] Appl. No.: 443,360

[22] Filed: Nov. 30, 1989

[30] Foreign Application Priority Data

Nov. 30, 1988 [CH] Switzerland ............ 4444/88

[51] Int. Cl.$^5$ .............................................. D05B 27/22
[52] U.S. Cl. ...................................... 112/315; 112/316
[58] Field of Search ................................ 112/315, 316

[56] References Cited

U.S. PATENT DOCUMENTS

| | | |
|---|---|---|
| 1,025,139 | 5/1912 | Huffman et al. ............ 112/315 |
| 2,218,287 | 10/1940 | LeVesconte ................. 112/316 |
| 2,711,145 | 6/1955 | Pagni ......................... 112/316 |
| 4,095,540 | 6/1978 | Kaltenbach et al. ........ 112/315 |
| 4,444,142 | 4/1984 | Meier ......................... 112/315 |
| 4,501,213 | 2/1985 | Meier ......................... 112/316 |
| 4,584,955 | 4/1986 | Sano ........................... 112/315 |
| 4,638,752 | 1/1987 | Hartwig ................... 112/315 X |
| 4,756,263 | 7/1988 | Sano ........................... 112/315 |

FOREIGN PATENT DOCUMENTS 249970 4/1926 United Kingdom .

Primary Examiner—Peter N. Nerbun
Assistant Examiner—Paul C. Lewis
Attorney, Agent, or Firm—Cushman, Darby & Cushman

[57] ABSTRACT

An adjustment device for the amplitude and direction of feed of cloth in a cloth transport mechanism for a sewing machine comprises a slideway centered on a trajectory in contact with a pivot pin between a connecting rod integral with an eccentric of a drive shaft and a short connecting rod linked to a lever associated with one end of the cloth transport member. This slideway may be oriented about a point situated in the middle of the trajectory of the pivot point to modify the inclination of the trajectory, and, in this way, the amplitude and the direction of the feed. To avoid any play between the slideway and the pivot pin, this latter carries two rollers in the shape of truncated cones, and the slideway has two tracks, inner and outer, displaced axially along the axis of pivoting in such a manner that each roller can only be put in contact with one of the two tracks by a resilient pressure and can roll without slipping against it.

4 Claims, 3 Drawing Sheets

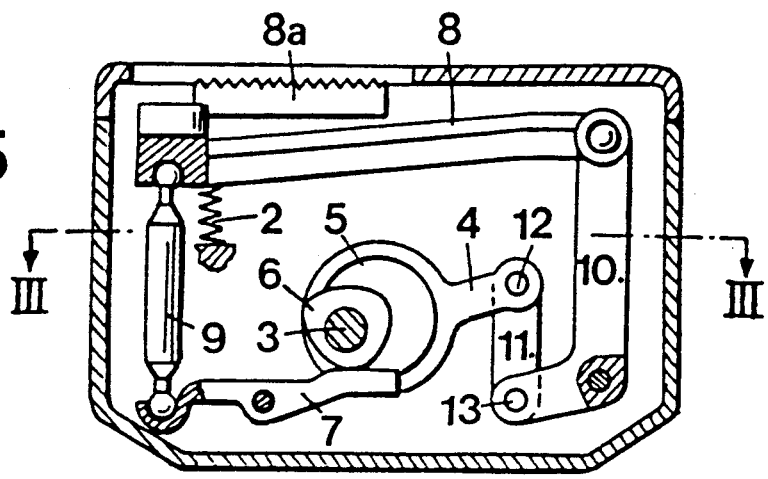
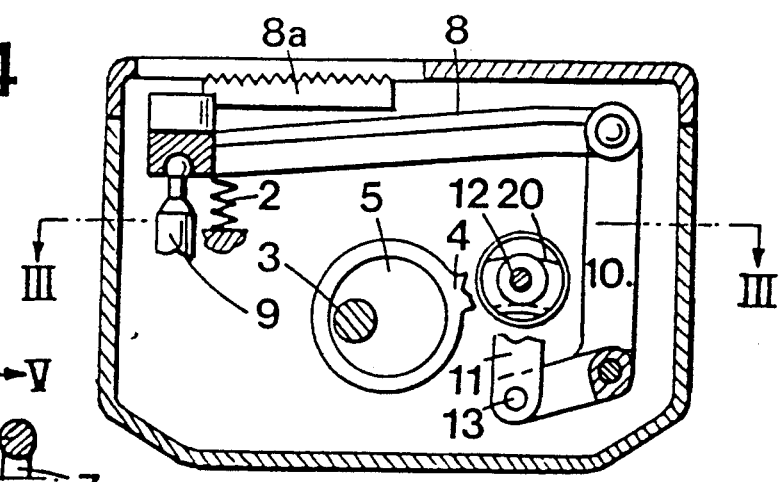
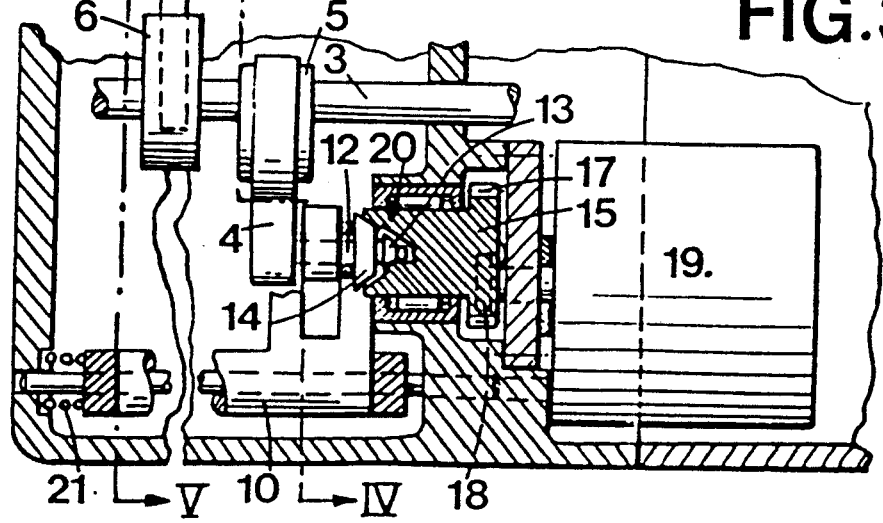

ADJUSTMENT DEVICE FOR FEEDING CLOTH IN A CLOTH TRANSPORT MECHANISM FOR A SEWING MACHINE

BACKGROUND OF THE INVENTION

1. Field of the invention

The present invention relates to a sewing machine comprising a cloth transport mechanism associated with a device for adjusting the amplitude and the direction of the feed of the cloth, this mechanism comprising a drive shaft and a cloth transport member whose two opposite ends are connected kinematically to this drive shaft by two connecting rod and lever mechanisms, one of which defines a first displacement trajectory in a direction substantially parallel to a support plane for the cloth, while the other defines a second displacement trajectory in a direction substantially perpendicular to this plane, the said adjusting device comprising a slideway having two tracks in the form of arcs of concentric circles centered on a trajectory described by a pivotal connection between two connecting rods, this slideway being pivotably mounted about an axis passing through the center of this trajectory.

2. Description of the prior art

There already exists on the market sewing machines whose transport mechanism is equipped with such an adjusting device for its amplitude and for its direction of cloth feed. In these machines sold under the Trade Mark ELNA, types 5000, 6000 and 7000, the angular position of the control cam is determined by means of a stepper motor.

A problem posed by this adjusting device arises from the guidance of the axis of pivoting between the connecting rod and the short connecting rod along a slideway formed by two tracks in the form of arcs of concentric circles. The engagement between such a cam profile and a follower concentric with the above mentioned axis of pivoting does not permit the carrying out of too tight an adjustment because of the risk of seizure between the follower member and the slideway. To avoid this disadvantage, a small play exists between the slideway and the follower member mounted about the axis of pivoting. This play constitutes a source of imprecision in the path of transport of the cloth, in particular in the case of changing the direction of this transport. This results, in particular in the case of the sewing of a buttonhole, in adjacent edges possibly having different lengths. In effect, as small as this error may be, by multiplying itself by the number of stitches, it finishes by becoming visible to the eye, especially in the case of a symmetrical pattern of the type of that of a buttonhole.

BRIEF SUMMARY OF THE INVENTION

An object of the present invention is to overcome, at least in part, this source of error, by means of a solution permitting the elimination of all play between the slideway of the adjustment device and the axis of pivoting.

Accordingly, the present invention has for its subject a sewing machine comprising a cloth transport mechanism associated with a device for adjusting the amplitude and the direction of the feed of the cloth, the cloth transport mechanism comprising a drive shaft and a cloth transport member, the cloth transport member having two opposite ends, each of which is connected kinematically to the drive shaft by a respective connecting rod and lever mechanism, one of the connecting rod and lever mechanisms defining a first displacement trajectory in a direction substantially parallel to a support plane for the cloth while the other of the connecting rod and lever mechanisms defines a second displacement trajectory in a direction substantially perpendicular to said support plane, the adjusting device comprising a slideway having two tracks in the form of arcs of concentric circles centered on a trajectory described by a pivotal connection between two connecting rods, and said slideway being mounted pivotingly about an axis passing through the center of said trajectory described by said pivotal connection, wherein said pivotal connection carries two rollers associated with resilient means for putting these rollers each in contact with a respective one of said tracks.

By virtue of this arrangement, each track in the form of an arc of a circle is only in contact with one roller, so that each roller may roll without slipping on its track, which permits complete elimination of all play between slideway and roller and, by the same, an important source of error in the length of stitches defined by the adjustment device. An important improvement is thus brought to the well known problem of the sewing of symmetrical patterns laid out in the direction of transport of the cloth. The solution proposed is simple and it renders the adjustment device insensitive to the problems of wear.

BRIEF DESCRIPTION OF THE DRAWINGS

The accompanying drawings illustrate schematically, and by way of example, an embodiment and a variant of the transport mechanism of the sewing machine the subject of the present invention.

FIG. 3 is a sectional view of an embodiment of this mechanism, on the line III—III of FIGS. 4 and 5.

FIG. 4 is a sectional view on the line IV—IV of FIG. 3.

FIG. 5 is a sectional view on the line V—V of FIG. 3.

DETAILED DESCRIPTION OF THE DRAWINGS

Figure 1:
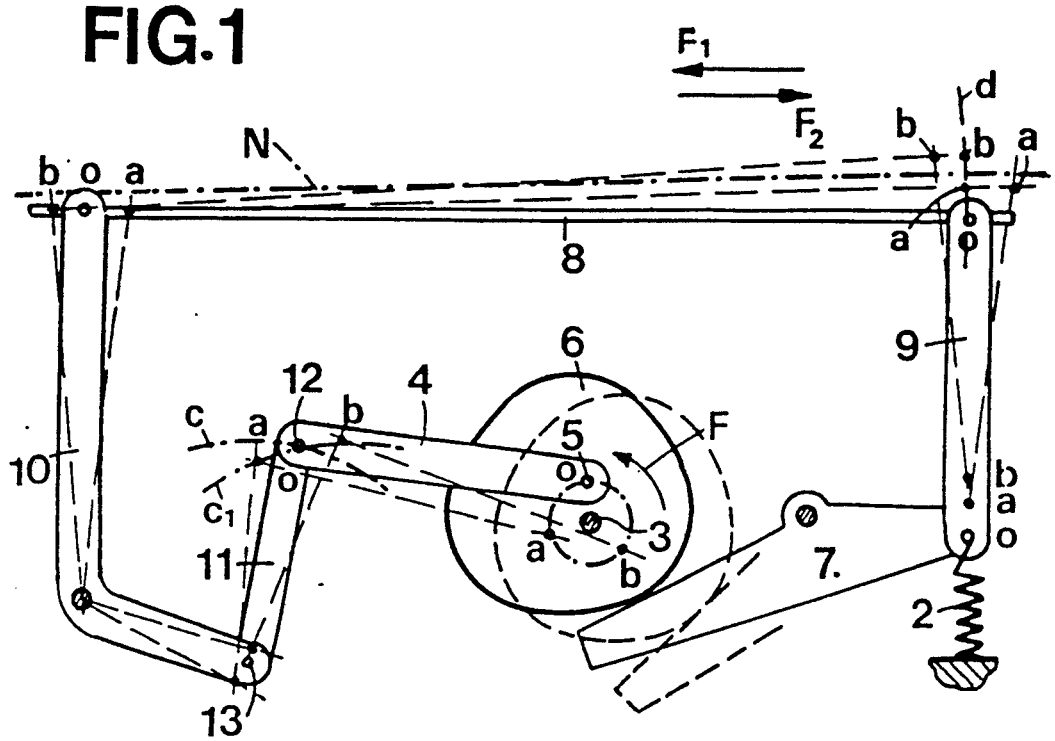
FIGS. 1 and 2 are two schematics explanatory of the functioning of this transport mechanism.
Figure 2:
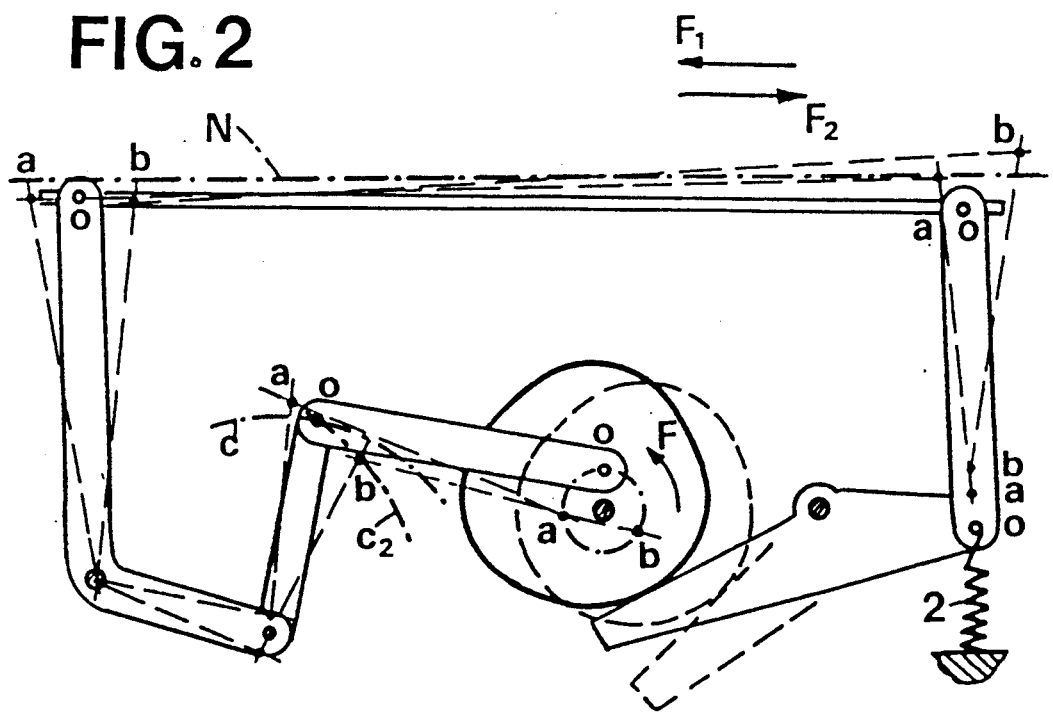

The principle of the cloth transport mechanism and of its regulating device are illustrated by FIGS. 1 and 2. This mechanism comprises a cooperating drive shaft 3 and connecting rod 4, one end of which is pivotally connected about an eccentric 5 describing a circular trajectory about the axis of this drive shaft 3. This shaft 3 also carries a cam 6 against which there presses an arm of lever 7 whose other arm is connected to one end of a cloth transport member 8 by a connecting rod 9. A return spring 2 acts to maintain the lever 7 in contact with the cam 6.

The other end of this transport member 8 is pivoted to an arm of a lever 10 whose other arm is connected to the connecting rod 4 by a short connecting rod 11. p Let us suppose that the end of the connecting rod 4 occupies the position o about the axis of the drive shaft 3 corresponding to the median position of the trajectory defined by the eccentric 5. The other elements of the mechanism occupy the respective positions o illustrated in solid outline. If the drive shaft 3 starts to turn in the direction of the arrow F, the pivotal joint 12 between the connecting rod 4 and the short connecting rod 11 describes an arc of a circle c centered on the pivot point 13 between the short connecting rod 11 and the arm of the lever 10 to which its other end is pivotally linked. Consequently, this lever 10 remains stationary. During this time, the lever 7 is displaced by the cam 6 from the point o to the point b on the trajectory in the arc of a circle d of the end of the member 8, which is centered on the stationary lever 10.

This movement of the cloth transport member 8 thus has as its only result the raising of this member without communicating to it a movement in a direction F1 or F2 corresponding to the forward or backward transport of the cloth. Let us now suppose that the circular trajectory c is tilted about the median position o of the pivotal joint 12 to impress on this pivot point 12 a new trajectory $c_1$. When the connecting rod 4 passes from the position o to the position a, the pivot point 12 is thus displaced to a on the trajectory $c_1$, thus causing tilting of the lever 10 also into the position a (FIG. 1). During this time, the lever 7 is also displaced into the position a, so that the transport member 8 submitted to the combined movements of the lever 10 and the connecting rod 9 is displaced from the position o to the position a which corresponds to a raising accompanied by a displacement in the direction of the arrow $F_2$. Given that this displacement from o to a takes place below the level N which corresponds to the limit of feeding of the cloth, the cloth is not advanced. From a to b, the movement of the lever 10 is inverted so that it drives the transport member 8 in the direction $F_1$, while the connecting rod 9 passes from the level of the point a to that of the point b, again raising the level of the end of the transport member 8. The travel from a to b of this member 8 thus takes place entirely above the level N, so that the cloth is drawn along in the direction $F_1$. The amplitude of this displacement depends on the inclination given to the trajectory c of the axis of pivoting 12, which thus goes from zero in the position c of the trajectory to the maximum illustrated by the trajectory $c_1$.

By inclining this trajectory c in the other direction, for example into the position of the trajectory $c_2$ illustrated by FIG. 2, a transport of the cloth in the opposite direction is obtained. In effect, from o to a the lever 10 is first of all driven in the direction $F_1$ while the lever 7 and the cam 6 bring the connecting rod 9 and the transport member to the feeding level N. From a to b, the displacement takes place above this feeding level N in the direction $F_2$, that is to say in the opposite direction to that of FIG. 1, so that the cloth is transported in this direction $F_2$. The displacement in the direction $F_1$ taking place below the feeding level as before, the amplitude of the path of the cloth equal to a length of stitch may be modified from zero to a maximum by varying the inclination of the trajectory c as far as the trajectory $c_2$.

The operating principle of this mechanism and of the adjustment of the direction and of the amplitude of the path of transport equal to a length of stitch having been explained, we now describe an embodiment illustrated by FIGS. 3 to 5, and we will pay particular attention to the device used to adjust the inclination of the trajectory c. In these figures there may be recognized the drive shaft 3, the connecting rod 4 connected to the shaft 3 by the eccentric 5 defining the circular trajectory about the axis of this shaft 3, the portion of the lever 10 linked to the short connecting rod 11, and the pivot pin 12 between this short connecting rod 11 and the connecting rod 4. There may furthermore be noted the cam 6, the lever 7, the connecting rod 9 and the transport member 8 carrying a grip 8a adapted to come into contact with the cloth during its transport.

As may be seen in FIG. 3, the pin 12 carries two frustoconical rollers 13 and 14 which engage in a slideway 20 arranged in a movable member 15 rotatably mounted in a needle pedestal 16 fixed in a frame B carrying the transport mechanism. This movable member 15 carries a gear 17 adapted to come into contact with a pinion 18 fixedly associated with the shaft of a stepping motor 19 and adapted to orient the slideway 20 about the central point o of the trajectory of the pin 12, as illustrated by FIGS. 1 and 2. A spring 21, disposed between the frame B and the lever 10, presses the lever, and consequently the pin 12 and the rollers 13 and 14 which it carries, axially in the direction of the movable member 15.

Figures 6, 7, 8:
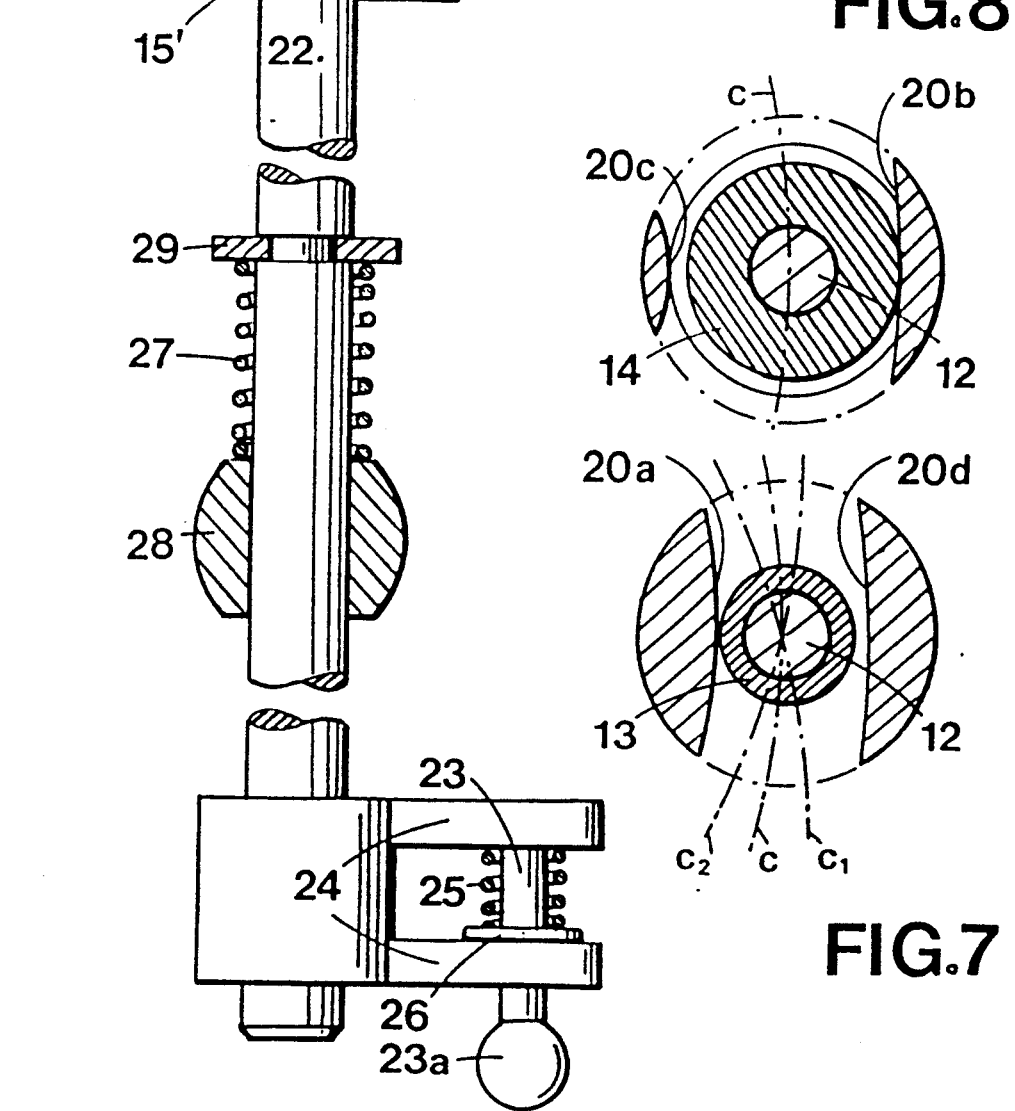
FIG. 6 is a sectional view of a detail of a variant of the embodiment of FIG. 3.
FIG. 7 is a sectional view on the line VII—VII of FIG. 6.
FIG. 8 is a sectional view on the line VIII—VIII of FIG. 6.

If FIGS. 6 to 8 are referred to to examine in more detail the slideway 20 and the rollers 13 and 14, it is to be noted that this slideway is formed by two tracks in the form of concentric arcs of circles 20a and 20b, generated by a cone rolling on the trajectory of the axis 12. The inner track 20a has towards the base of the trunk of the cone, a clearance portion 20d which is situated at the level of the roller 14, while the outer track 20b has a clearance portion 20c which is situated at the level of the roller 13. Given that the tracks 20a and 20b are generated by frustoconical surfaces of the same angle at the apex as that of the tracks 20a, 20b rolling along the trajectory c (FIGS. 1, 2 and 7), the rollers 13 and 14, urged by the spring 21 (FIG. 3), are in contact with the inner track 20a and the outer track 20b respectively. Taking account of the path difference travelled on each of these tracks for the same angular distance about the axis 13 of the short connecting rod 11 (FIGS. 1 and 2), each of these rollers only being in contact with one of the tracks forming the slideway 20, there are now no problems of rubbing or of seizing and no play is needed to prevent such problems. The presence of the spring 21 and the conical form of the rollers and of the slideway moreover suppresses any possibility of play.

During operating, the length and the direction of the feeding path of the transport element 8 are defined by the angular orientation of the slideway 20 about the axis of rotation of the movable member 15, thus defining the position of the trajectory c about this axis between the limit positions $c_1$ and $c_2$ (FIG. 7), as has been explained in detail in regard to FIGS. 1 and 2. In a sewing machine with computerized control, the stepping motor 19 receives the orders for angularly positioning the slideway 20 from a microprocessor (not shown).

It must also be stated that, as illustrated by FIG. 3, the assembly of the transport mechanism described above, as well as the positioning motor 19 of its device for adjusting the amplitude and the direction of feed acting on the angular position of the slideway 20, are combined with the frame B, which is fixed by the usual fastening members (not shown) to the principal frame B' of the sewing machine. In this way, the transport mechanism and its positioning motor form a completely independent assembly.

The variant illustrated by FIG. 6 only differs from the embodiment of FIG. 3 in that the movable member 15' carrying the slideway 20 is fixedly associated with the end of a shaft 22 which carries at its other end an eccentric formed by a rod 23 parallel to the axis, slidingly mounted across two guide plates 24 and urged axially by a spring 25, one end of which acts against one of the guide plates 24 while the other end acts against a flange 26 mounted on this rod 23, whose outer end terminates in a spherical surface 23a intended to come in contact with a driving member for angularly positioning the slideway 20 about the axis of the shaft 22. A spring 27, whose function is equivalent to that of the spring 21 of FIG. 3, disposed about the shaft 22, acts against, on the one hand, a ring 28 adapted to be fixedly connected to the frame and in which this shaft 22 slides, and, on the other hand. a flange 29 mounted on this shaft, thus resiliently applying the slideway 20 against the rollers 13 and 14.

We claim:

1. A sewing machine comprising a cloth transport mechanism and an adjusting device for adjusting cloth transport of said mechanism in amplitude and direction, the cloth transport mechanism comprising a drive shaft and a cloth transport member, the cloth transport member having two opposite ends, each of which is connected kinematically to the drive shaft by a respective connecting rod and lever mechanism, one of the connecting rod and lever mechanisms defining a first displacement trajectory in a direction substantially parallel to a support plane for the cloth while the other of the connecting rod and lever mechanisms defines a second displacement trajectory in a direction substantially perpendicular to said support plane, the adjusting device comprising a slideway having two tracks in the form of arcs of concentric circles centered on a trajectory described by a pivoting axis of a pivotal connection between two connecting rods of one of said connecting rod and lever mechanisms, and said slideway being mounted pivotingly about an axis parallel to said pivotal axis and passing through the center of said trajectory described by said pivotal connection, wherein said pivotal connection carries two rollers associated with resilient means for putting these rollers each in contact with a respective one of said tracks.

2. A sewing machine according to claim 1, wherein said drive shaft is fixedly associated with an eccentric connected to a connecting rod and is fixedly associated with a cam connected to a lever, one of the ends of said cloth transport member being pivotally linked to an arm of a lever defining the first displacement trajectory and the other end of said cloth transport member being connected kinematically to said cam, said cam defining said second displacement trajectory, a second arm of said lever being connected to a free end of said connecting rod connected to the eccentric by a short connecting rod which defines, for the end of said connecting rod pivoted to said short connecting rod, said trajectory described by said pivotal connection, in the form of an arc of a circle about said second arm of said lever, the pivotal connection between said connecting rod and said short connecting rod being in contact with said slideway.

3. A sewing machine according to claim 1, wherein said tracks in the form of arcs of circles are defined by the rolling of a cone along the trajectory of said pivotal connection, each of these tracks being provided with a clearance on a portion of its width and along its entire length, the clearance of one track being axially displaced with respect to that of the other track, each of said rollers being in the shape of a truncated cone of a diameter and of an angle corresponding to those of the respective track and being pivoted about said pivotal connections, said resilient means tending to exert an axial pressure between the rollers and the tracks.

4. A sewing machine according to claim 1, wherein said cloth transport mechanism and its adjusting device for amplitude and the direction of feed of the cloth are mounted on a frame independent of that of the sewing machine and this frame carries a motor for the activation of said regulating device.

* * * * *